Patented July 5, 1938

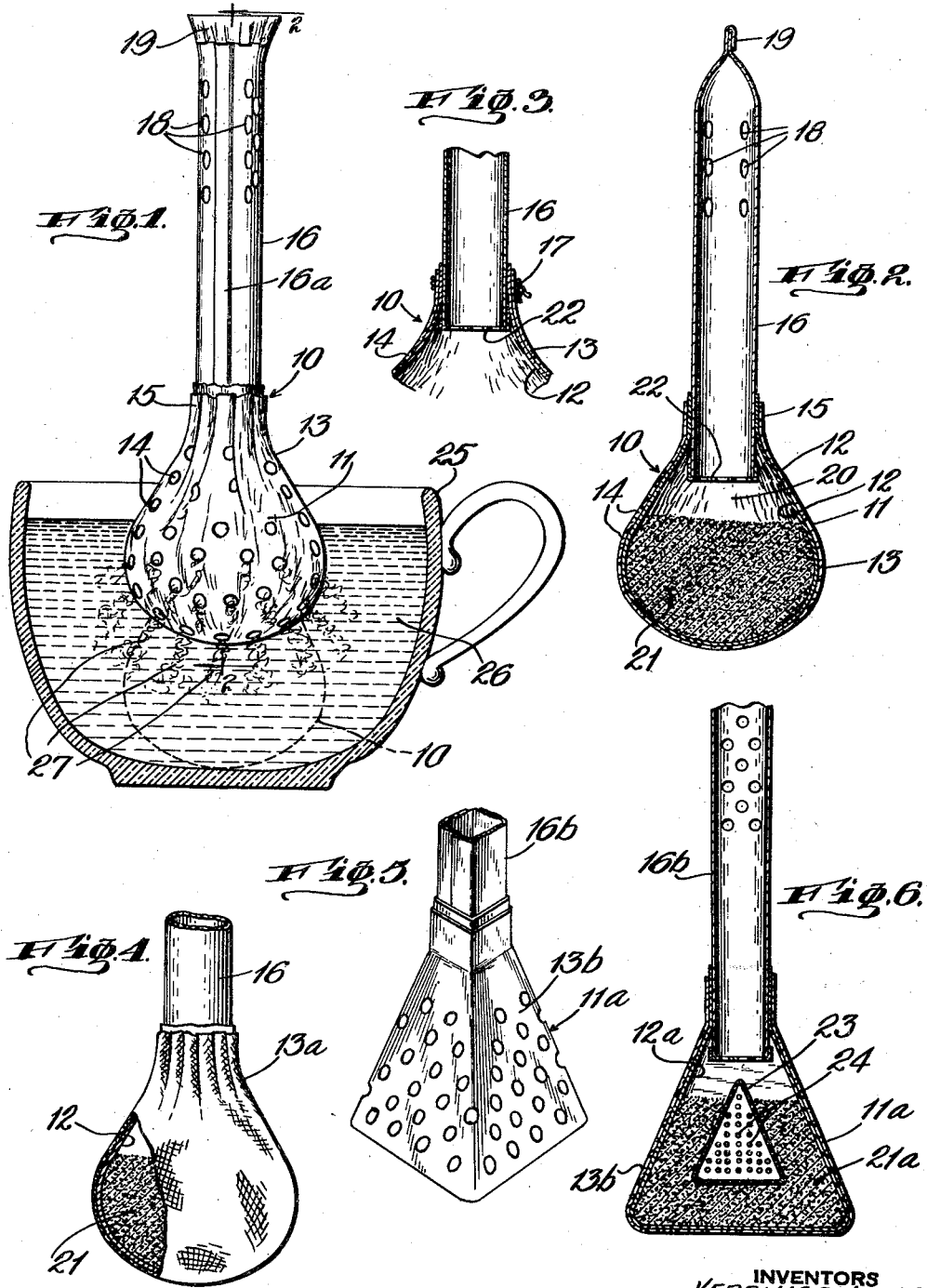

2,123,054

UNITED STATES PATENT OFFICE 2,123,054

COFFEE MAKING DEVICE

Veronica Lamb and Edmund J. Lamb, New York, N. Y.

Application August 5, 1937, Serial No. 157,506

7 Claims. (Cl. 99—77.1)

This invention relates to devices for making coffee, and the object of the invention is to provide a container or receptacle in which ground or pulverized coffee is adapted to be placed and the receptacle arranged in a container in which coffee is to be made and boiling water then introduced into the container and exposed to the coffee in said receptacle to form a clear coffee in a relatively short period of time, in such quantity as will be consistent with the size of the receptacle and the amount of coffee arranged therein; a further object being to provide a device of the character described wherein the receptacle is formed from an inner sheet of filtering material and an outer openwork or perforated sheet, the latter forming means for reinforcing and supporting the inner filter sheet; a further object being to provide means for venting the receptacle in order that steam and vapor forming in the receptacle may escape therefrom and also to provide a handle by means of which the device may be handled and, if desired, agitated or moved in the water to expedite the making of coffee, and further to regulate the strength of coffee desired; a still further object being to provide a device of the character described wherein the receptacle is made in predetermined shape or form, and further wherein means is provided for encouraging circulation of water through the receptacle, and with these and other objects in view, the invention consists in a device of the class and for the purpose specified which is sanitary in construction, efficient in use, and which is constructed as hereinafter described and claimed.

The invention is fully disclosed in the following specification, of which the accompanying drawing forms a part, in which the separate parts of our improvement are designated by suitable reference characters in each of the views, and in which:

Fig. 1 is a sectional view through a container illustrating the use of one of our improved devices.

Fig. 2 is a longitudinal sectional view through the device detached.

Fig. 3 is a detail sectional view showing a modified form of construction.

Fig. 4 is a side and sectional view of one end of another form of device which we employ.

Fig. 5 is a perspective view of one end of another modified form of device, and

Fig. 6 is a sectional view of the device shown in Fig. 5.

It is the purpose of our invention to provide a device containing measured quantities of ground or pulverized coffee, and preferably coffee which has been rendered substantially dust-proof. While in a general use it is desirable to produce the device of a capacity to make a single cup of coffee, it will be apparent that the devices may be made of such size and coffee capacity as to adapt them for the making of two or more cups of coffee by placing the device in a receptacle sufficiently large to receive the number of cups of water required to make the required amount of cups of coffee.

In manufacturing the respective devices, the same will be packed in suitable containers in preferably half-pound or pound sizes, with respect to the coffee and not the packages as a whole, or if it be preferred, the container may be sold by the quantity of coffee making receptacles contained therein. In this connection it is also to be understood that the containers may have receptacles all of one size or capacity, or of varying sizes and capacities. That is to say, a number of one cup receptacles could be combined with a number of two, three, or more cup receptacles as may be desired.

To illustrate one use of the invention we have shown in Figs. 1 and 2 of the drawing at 10 one type of coffee making receptacle or device which is of the single or one-cup capacity. This device consists of a ball or ball-like element 11 formed from an inner sheet 12 of filtering material such for example as filter paper and an outer sheet or casing 13 of suitable open-work material which, in the construction shown, consists of a sheet of cellulosic material such for example as "Cellophane" having perforations or openings 14 arranged therein throughout substantially the entire area of the sheet, except at the upper contracted collar portion 15 thereof.

The edges of both inner and outer sheets 12 and 13 are drawn together and arranged around the lower end portion of a tube 16 and secured thereto by a suitable adhesive as in Figs. 1 and 2, or by means of encircling threads or bands 17, as in Fig. 3.

The tube 16 is also preferably composed of cellulosic material and may be constructed in any desired manner, and preferably of a thickness to give sufficient stability thereto to form a handle for the device. The tube in the construction shown is formed from a sheet of material having its edge portions attached as indicated at 16a in Fig. 1 of the drawing. The upper end of the tube 16 is provided with a series of vent openings 18, and the end of the tube is folded upon itself and sealed together as indicated at 19 to form a closure for said tube as well as a finger piece by means of which the tube may be handled.

The lower end of the tube 16 projects into a chamber 20 formed in the upper part of the ball or ball-like element 11 above the ground or pulverized coffee 21 contained therein. It is also preferred that a strainer cap 22 be attached to the inner end of the tube 16 which will operate to prevent the discharge of the coffee 21 through the tube 16, especially in the handling and shipment of the device, while at the same time permitting air, steam, or vapor, to rise upwardly through the tube in the use of the device.

In Fig. 4 of the drawing a slight modification of the structure shown in Figs. 1 and 2 is illustrated. In this figure, an outer protector casing or jacket 13a of mesh or net work material is provided, such for example as a piece of cheesecloth or gauze, or any suitable material of this kind. This jacket 13a takes the place of the jacket or sheet 13 of the construction shown in Figs. 1 and 2, otherwise the device shown in Fig. 4 is the same as that shown in said other figures, part of the tube 16 being shown and the filter sheet being indicated partly in section.

In Figs. 5 and 6 of the drawing another form of construction is shown which differs from that shown in Figs. 1 and 2 primarily in the shape of the element 11a and in the shape of the tube 16b. The latter is preferably square in cross sectional form, whereas the element 11a is substantially conical in form and is made from an outer sheet 13b of perforated cellulosic material and an inner filter sheet 12a.

With the construction shown in Figs. 5 and 6 it is also preferred that an inner circulating element 23 be employed within the element 11a, the element consisting of a substantially conical hollow body having fine perforations therein as indicated at 24 so as to prevent the ground coffee 21a from entering the interior of the element 23, while at the same time permitting the circulation of water therethrough. The element 23 will operate to expose the body of coffee 21a more quickly to the water and tend to produce a quicker action in the making of coffee. In this connection it will be understood that many shapes and forms of devices may be provided so long as such devices provide a means for filtering or substantially filtering the coffee, while at the same time permitting the boiling water to contact the ground coffee in the operation of making a predetermined quantity of coffee.

In Fig. 1 of the drawing we have shown at 25 a coffee cup to illustrate the use of the device shown in Figs. 1 and 2. In making a cup of coffee it is preferred that the device 10 be first placed in the bottom of the cup 25 in the manner indicated by dotted lines in Fig. 1, after which boiling water is poured into the cup to a height substantially filling the cup so that when the coffee has been made, and the device 10 removed, a conventional cup of liquid coffee will remain in the cup. That is to say, a sufficient quantity to permit the addition of cream and sugar if desired.

In the above operation of placing the hot water in the cup 25, the device 10 will rise to the top of the cup substantially in the position indicated in full lines. After a period of five to eight minutes, the device will sink to the bottom of the cup at which time, we have found, a cup of coffee of the desired strength has been formed.

In the early stages of making the coffee, the coffee oils will seep out through the openings 14 into the water 26 in the cup in the manner indicated by the streams 27, and by employing a sheet of filtering material such for example as filter paper 12, we have found that a very clear coffee will be made. If it is desired to produce a very strong coffee in a short period of time, the device is agitated vertically in the cup a number of times. However, this agitation should not be vigorous especially when filter paper is employed, in that vigorous agitation may rupture the paper. We have also found it desirable in expediting the making of a cup of coffee to agitate the device vertically in the water 26 immediately after the boiling water has been introduced into the cup, which will more quickly saturate the coffee grounds and thereby produce a quicker action. It will be apparent that the upwardly extending tube forms a convenient handle member facilitating the agitation and the removal of the device from the cup when the coffee is made.

A cup or volume of coffee made with one of our improved devices will be clear and without any muddy or cloudy contents, especially if excessive agitation is dispensed with, and all of the undesirable properties of the coffee, tending to make better coffee, are retained within the receptacle or the filter sheet. It will also appear that by providing the tube with the vent passages 18 therein, the heated air in the chamber 20 and the steam or vapor rising from the ground coffee is free to pass upwardly through the tube and out through said vent apertures, which will permit a more efficient operation of the device and encourage circulation of the water through the ground coffee, as will be apparent.

It will also be understood that when using such cellulosic material as "Cellophane" in the construction of the outer casing or jacket 13 and the tube 16, a very clean and sanitary appearance is provided for the entire device, and one which will have the required strength to withstand the boiling water used in the making of coffee. It will also appear that by perforating substantially the entire sheet 13, the water will readily enter the receptacle to contact the grounds therein. The uppermost apertures will provide additional means for the escape of vapors as will be apparent.

It is a well known fact that coffee grounds will sink when they are saturated, but will otherwise float in water. By scientifically constructing the device from a standpoint of a given amount of coffee therein and the thickness of the filter paper 12 employed, and the structure of the open work outer sheet 13, 13a, the device may be so regulated as to sink as and when coffee of the proper strength is made. This will indicate to the public as a whole the manner or timing of making a cup of coffee of the proper strength. Of course there are varied tastes and desires in this regard, and instructions can of course be made in the merchandising of our product to make weak, mild, and strong coffee.

It will be apparent that in the manufacture of the devices, automatic means may be provided for placing a measured amount of coffee upon the sheets 12, 13, possibly in a partially formed shape, and then the edges of the sheets may be attached to the projecting tube of the device. On the other hand, it is also possible to completely assemble the device and feed the coffee thereinto through the tube after which the upper end thereof may be closed and sealed as at 19. In this way, the device may be economically produced so as not to materially increase the cost of the quantity of coffee sold.

Having fully described our invention, what we claim as new and desire to secure by Letters Patents, is:

1. A device of the class described comprising a receptacle containing a predetermined measured quantity of ground coffee, said receptacle consisting of an outer jacket of openwork material, an inner facing or lining of filtering material, and a tubular member inserted in said receptacle and projecting therefrom.

2. A device of the class described comprising a receptacle containing a predetermined measured quantity of ground coffee, said receptacle consisting of an outer jacket of openwork material, an inner facing or lining of filtering material, a tubular member inserted in said receptacle and projecting therefrom, and the outer end portion of said member having vent apertures.

3. A device of the class described comprising a receptacle containing a predetermined measured quantity of ground coffee, said receptacle consisting of an outer jacket of openwork material, an inner facing or lining of filtering material, a tube opening into said receptacle and projecting therefrom, the outer end portion of said tube having vent apertures, the inner end of said tube being exposed to the ground coffee in the receptacle, and openwork means at the inner end of the tube for preventing the discharge of coffee therefrom.

4. A device of the class described comprising a receptacle containing a predetermined measured quantity of ground coffee, said receptacle consisting of an outer jacket of openwork material, an inner facing or lining of filtering material, a tube opening into said receptacle and projecting therefrom, the outer end portion of said tube having vent apertures, the inner end of said tube being exposed to the ground coffee in the receptacle, openwork means at the inner end of the tube for preventing the discharge of coffee therefrom, and a hollow perforated body portion within the receptacle and the coffee contained therein.

5. A device of the class described comprising a receptacle containing a predetermined measured quantity of ground coffee, said receptacle consisting of an outer jacket of openwork material, an inner facing or lining of filtering material, a tubular member inserted in said receptacle and projecting therefrom, and said jacket and tubular member being composed of cellulosic material.

6. A device of the class described comprising a receptacle containing a predetermined measured quantity of ground coffee, said receptacle consisting of an outer jacket of openwork material, an inner facing or lining of filtering material, a tubular member inserted in said receptacle and projecting therefrom, the outer end portion of said member having vent apertures, and said member being composed of cellulosic material.

7. A device of the class described comprising a hollow body forming a holder for a measured quantity of ground coffee, the wall structure of said body having filtering properties, a vent tube projecting from said body with the inner end of the tube exposed to the ground coffee in said body, means for preventing displacement of the ground coffee through said tube, and said tube being formed from celulosic material and forming a handle member for the device.

VERONICA LAMB.
EDMUND J. LAMB.